United States Patent Office 3,373,056
Patented Mar. 12, 1968

3,373,056
MODIFYING CELLULOSE ESTER OSMOTIC MEMBRANES
Fred Eli Martin, Azusa, Calif., assignor to Aerojet-General Corporation, Azusa, Calif., a corporation of Ohio
No Drawing. Filed Aug. 28, 1964, Ser. No. 392,932
7 Claims. (Cl. 117—144)

ABSTRACT OF THE DISCLOSURE

A method for improving the salt retention characteristics of a cellulose reverse osmosis membrane by treatment with various modifiers such as polyvinyl methyl ether, guartec gum, activated charcoal and copper ferrocyanide.

---

This invention deals with the use of membranes for the concentration of solutions. More particularly, this invention deals with the demineralization of saline waters including sea water, and other waters containing various dissolved inorganic salt. This invention also finds application in the removal of materials from a solution, such as detergents, viruses, proteins, and other such material.

The removal of water from aqueous solutions and the concurrent concentration of the solute is a common practice. It is usually attained by distillation techniques. More recently a method has been developed for the concentration of solutions using a semi-permeable osmotic membrane. These membranes, however, particularly when used for the desalination of saline water have proven to be unsatisfactory in reducing the sodium chloride content of the saline water to an acceptable level at an acceptable flow rate of water through the membrane.

A further problem in the utilization of these membranes is the formation of microscopic and/or macroscopic holes which often form in the membrane or which are present when the membrane is originally formed, which allow the passage of sodium chloride and other substances through the membrane in unsatisfactory quantities.

An additional problem encountered with known membranes is the fact that they must be stored in water prior to use. Excessive exposure to air will cause the membranes to be ineffective for the concentration of solutions or desalination of water.

It is an object of this invention to provide a semi-permeable osmotic membrane which will concentrate solutions at a rate and with results far better than those which have heretofore been available.

It is a further object of this invention to provide a semi-permeable osmotic membrane which will reduce the concentration of saline water below 500 parts per million in a single pass, at a flow rate on the order of 8 to 9 gallons per square foot of membrane per day.

An additional object of this invention is to provide a method for treating known membranes which improves their performance in concentrating solutions.

It is an additional object of this invention to provide a method for "plugging" holes of both microscopic and macroscopic size, in osmotic membranes.

An additional object of this invention is to provide a process for treating osmotic membranes so that they may be stored in air prior to use.

Further objects and additional advantages of the invention will become apparent from the following detailed description.

The invention involves the treatment of membranes such as those disclosed in U.S. Patent No. 3,133,132 as well as other membranes of a similar nature. These membranes are prepared by casting a solution of a film-forming cellulosic ester, water, a solvent for the cellulosic ester and a swelling agent for the cellulosic ester.

Any solvent for a cellulosic ester such as acetone, dioxane, methyl ethyl ketone, ethyl alcohol and/or methyl alcohol may be used as solvents. However, acetone is the preferred solvent. Generally, sufficient solvent is employed to reduce the viscosity of the casting solution to be easily handled. Preferably from about 200 to about 400 parts of solvent are employed per 100 parts of cellulosic ester. The cellulose acetate membranes are prepared by casting a film of the above described solution on glass at a temperature below about 0° C. Preferably the casting solution is maintained at about $-12°$ C. to about 0° C. The film may be cast at a thickness of about 2.5 mils to about 20 mils. After the film is cast, it is allowed to dry for a time sufficient to allow any streaks created by the knife blade in casting the film to smooth out. Generally, this time is from about three minutes to about eight minutes. This drying time is not essential to the creation of a useful membrane, however, it is desirable in order to allow any streaks created by the knife blade in casting the film to smooth out.

The film cast on the glass is allowed to set in cool water, preferably ice water, for a time sufficient to allow the membrane to soak loose from the glass plate. In general, this time ranges from about 10 to about 20 minutes.

The membrane is then heated at a temperature of about 77° to about 90° C., preferably about 84° C., in order to fix the membrane and obtain desirable semi-permeability. The membrane is heated for a time ranging from about 5 minutes to about 1 hour or longer. The time for which the membrane is heated has little effect on the resulting flux and semi-permeability of the membrane. The temperature at which the membrane is heated, however, has a significant effect on the semi-permeability and flux of the membrane. A higher temperature will cut down the flux, the amount of material passing through the membrane, but will increase the amount of waste material removed, that is, the purity of the water recovered.

The membrane is then mounted in a pressure cell, with the air-dried surface of the membrane in contact with the solution to be treated. The pressure under which the solution is placed in order to obtain separation of pure water is at least the isomotic pressure of the solution. Generally, however, a higher pressure is desirable in order to obtain a better removal and higher flow of liquid through the membrane. Thus, the pressure applied is generally above about 1500 p.s.i. and may be as high as 3000 p.s.i.

Other membranes which may be formed in a similar manner to that described above and which are effectively treated by the method of this invention, include membranes based upon cellulosic esters other than cellulose as well as membranes based upon other than a cellulosic system.

METHOD NO. 1

A membrane prepared by the methods discussed above is treated in a solution of polyvinyl methyl ether (PVM).

The membrane is soaked in a PVM solution, ranging from an effective amount of PVM to about a 10% by weight solution. Preferably, the PVM solution is about 1% to about 5% by weight. The membrane is soaked in the PVM solution for a time ranging from about 30 minutes to about 24 hours. Generally, at least about 4 hours is required for optimum results.

When treated in this manner, the membrane may be dried, stored in air for an indefinite period, rewetted, and then replaced in a cell, and used for desalination with the same resulting flux and purity obtained prior to being dried.

To further illustrate the methods of this invention, there are presented the following examples in which all parts and percentages are by weight unless otherwise indicated.

*Example 1*

Six membranes were prepared in the following manner: A solution of 100 parts of cellulose acetate, 300 parts acetone, 4.5 parts magnesium perchlorate, 4.5 parts magnesium bromide, 4.5 parts zinc bromide, and 45 parts of water was cooled to −11° C., then cast 10 mils thick on glass at −11° C. After drying for 3 minutes, the film was set by immersing in ice water. The film was soaked loose from the glass plate, heated at 89° C. for five minutes, then stored in fresh water.

Two of the membranes were left untreated, two membranes were soaked 4 hours in aqueous 1% PVM, and two membranes were soaked 4 hours in aqueous 5% PVM. These six membranes were then placed between layers of absorbent paper and allowed to dry overnight, then removed and stored exposed to laboratory air for two weeks. These membranes were then examined as osmotic membranes for the desalination of a 3.5 weight percent NaCl solution at 1500 p.s.i.g. by reverse osmosis. The following data was collected:

| Membrane | Treatment | Run | Product Flux (g.f.d.) | Product Salt (p.p.m.) |
|---|---|---|---|---|
| 1 | Untreated | 1 | Nil | Salty |
|   |           | 2 | Nil | Salty |
| 2 | ...do... | 1 | Nil | Salty |
|   |           | 2 | Nil | Salty |
| 3 | 1% PVM    | 1 | 4.4 | 960 |
|   | 4 hours   | 2 | 5.2 | 960 |
| 4 | 1% PVM    | 1 | 8.8 | 790 |
|   | 4 hours   | 2 | 12.4 | 700 |
| 5 | 5% PVM    | 1 | 10.8 | 790 |
|   | 4 hours   | 2 | 13.6 | 900 |
| 6 | 5% PVM    | 1 | 10.0 | 555 |
|   | 4 hours   | 2 | 12.8 | 530 |

G.f.d.=gallons per square foot of membrane surface per day; p.p.m.= parts per million.

The runs designated "1" and "2" are short runs taken over a period of 2 hours. The membrane used in this example, shows the following results for desalination of a 3.5 wt. percent NaCl solution of 1500 p.s.i., when used directly as prepared, without being dried.

| Run | Product Flux (g.f.d.) | Product Salt (p.p.m.) |
|---|---|---|
| 1 | 10.5 | 750 |
| 2 | 10.5 | 725 |
| 3 | 10.5 | 580 |

METHOD NO. 2

The salt permeation characteristics of the above discussed osmotic membranes are improved by the addition of a trace of polyvinyl methyl ether (PVM) to the feed solution. Although applicant is not bound by theory, it appears that the PVM effectively plugs small holes which may exist in the osmotic membrane. As the feed solution containing PVM passes over the membrane, the PVM selectively plugs small holes and more open permeation sites. When the desired degree of improvement in the semi-permeability of the membrane has been obtained, the PVM modifier may be removed from the feed solution.

Materials other than PVM which are effective as membrane modifiers in plugging microscopic as well as macroscopic holes include powders, such as microscopic plastic balls; colloidal clays; gels, such as aluminum hydroxide, ferric hydroxide, and aluminum sulfate; organic colloids, such as maleic acid-vinyl alkyl ethers; and colloidal inorganic precipitates formed in situ, such as copper ferrocyanide. Mixtures of these modifiers may also be employed according to the method of this invention.

Generally, an effective amount to about 1.0% by weight of the modifier may be employed in the feed solution, preferably an amount ranging from about 100 p.p.m. to about 500 p.p.m. is employed.

*Example 2*

Six osmotic membranes were examined for the desalination of salt water by reverse osmosis, according to the following schedule:

(A) With a feed solution of 3.5 wt. percent NaCl at a linear velocity of 1 foot per second and a pressure of 1,500 p.s.i.g., (B) Then with a 3.5 wt. percent NaCl solution containing 100 p.p.m. PVM at the same linear velocity and pressure;

(C) After flushing the system with fresh water, again with a 3.5 wt. percent NaCl solution at the same linear velocity and osmotic pressure. The product flux and salt content were determined and the following data was collected:

| Membrane | Product A (from 3.5 wt. percent NaCl) | | Product B (from 3.5 wt. percent NaCl and 100 p.p.m. PVM) | | Product C (from 3.5 wt. percent NaCl) | |
|---|---|---|---|---|---|---|
|   | Flux (g.f.d.) | NaCl (p.p.m.) | Flux (g.f.d.) | NaCl (p.p.m.) | Flux (g.f.d.) | NaCl (p.p.m.) |
| 1 | 9.4 | 309 | 6.8 | 195 | 8.0 | 150 |
| 2 | 9.4 | 275 | 8.0 | 195 | 8.2 | 140 |
| 3 | 25.0 | 5,100 | 16.5 | 440 | 16.5 | 430 |
| 4 | 22.0 | 3,800 | 14.8 | 348 | 15.5 | 320 |
| 5 | 80.0 | 27,000 | 9.6 | 620 | 12.8 | 740 |
| 6 | 76.0 | 27,000 | 10.0 | 525 | 14.0 | 635 |

Membranes 1 through 6 were prepared from a solution of 100 grams of cellulose acetate, 300 grams acetone, 45 grams water, 4.5 grams magnesium perchlorate, 4.5 grams magnesium bromide hexahydrate, 4.5 grams zinc bromide, cast at −11° C., dried 3 minutes, set in 0° C.

water, then conditioned by heating for 5 minutes. Membranes 1 and 2 were heated at 89° C.; 3 and 4 at 84° C.; and 5 and 6 at 75° C.

*Example 3*

Three membranes were prepared from a solution of 100 grams of cellulose acetate, 300 grams acetone, 40 grams of water, 4.5 grams of magnesium perchlorate, 4.5 grams of magnesium bromide hexahydrate, 4.5 grams of zinc bromide, cast at −11° C., and dried 3 minutes, set in 0° C. water, then conditioned by heating at 82° C. for 5 minutes. Two circles were cut from each membrane and a ³⁄₁₆-inch hole was cut in one of the circles from each membrane. The total of six circles were mounted in a desalination cell and tested according to the following schedule:

(A) With a feed solution of 3.5 wt. percent NaCl at a linear velocity of 1 foot per second and a pressure of 1,500 p.s.i.a.;

(B) Then with a feed solution of 3.5 wt. percent NaCl containing 500 p.p.m. PVM and 500 p.p.m. copper ferrocyanide ($Cu_4Fe(CN)_6$) at the same linear velocity and pressure;

(C) After flushing with fresh water, again with a 3.5 wt. percent NaCl solution at the same linear velocity and pressure. The product flux and salt content were determined and the following data was collected:

| Cell | Standard Run No. 1—Feed: 3.5% NaCl | | Extended Run No. 1—Feed: 3.5% NaCl+500 p.p.m. $Cu_4Fe(CN)_6$+ 500 p.p.m. PVM | | Extended Run No. 2—Feed: 3.5% NaCl | |
|---|---|---|---|---|---|---|
| | Flux (g.f.d.) | NaCl (p.p.m.) | Flux (g.f.d.) | NaCl (p.p.m.) | Flux (g.f.d.) | NaCl (p.p.m.) |
| ³⁄₁₆ in. hole: | | | | | | |
| 1 | 30.0 | 5,200 | 5.5 | 300 | 18.0 | 260 |
| 2 | 68.0 | >5,600 | 6.5 | 4,500 | 18.8 | 2,250 |
| 3 | 25.5 | 4,800 | 7.0 | 550 | 15.4 | 235 |
| 4 | 60.0 | >5,600 | 9.5 | 4,500 | 18.0 | 3,300 |
| 5 | 29.0 | 4,200 | 9.5 | 360 | 18.4 | 205 |
| 6 | 80.0 | >5,600 | 9.5 | 3,100 | 17.6 | 1,850 |

*Example 4*

Three membranes were prepared from the casting solution used in Example 3, and conditioned by heating at 86° C. for five minutes. Six circles were tested for desalination properties in the following manner:

| Cell | Standard Run—Feed: 3.5% NaCl+500 p.p.m. activated charcoal +500 p.p.m. PVM | | Extended Run No. 1—Feed: 3.5% NaCl+500 p.p.m. guartec gum +500 p.p.m. PVM | | Extended Run No. 2—Feed: 3.5% NaCl | |
|---|---|---|---|---|---|---|
| | Flux (g.f.²d.) | NaCl (p.p.m.) | Flux (g.f.²d.) | NaCl (p.p.m.) | Flux (g.f.²d.) | NaCl (p.p.m.) |
| ³⁄₁₆ in. hole: | | | | | | |
| 1 | 9.0 | 185 | 4.0 | 156 | 14.6 | 150 |
| 2 | 22.2 | *18,400 | 3.4 | 2,000 | 13.6 | 53 |
| 3 | 9.0 | 750 | 3.6 | 224 | 11.6 | 86 |
| 4 | 15.6 | *16,000 | 4.0 | 1,360 | 13.6 | 390 |
| 5 | 10.2 | 200 | 4.0 | 120 | 13.6 | 143 |
| 6 | 13.2 | *12,400 | 4.0 | 900 | 12.4 | 300 |

*This data shows some hole plugging by activated charcoal and PVM. Without some plugging, the NaCl would have been about 35,000 p.p.m.

As described in the preceding experiments, treatment of a membrane with polyvinyl methyl ether either by soaking a membrane in a PVM solution, or including PVM in the feed solution is effective to improve membrane properties. Soaking the membrane in PVM solution allows the membrane to be stored in a dry condition. Including PVM in the feed solution for a period of time improves the desalination properties of the membrane. In addition, small holes which often occur in the osmotic membrane may be effectively plugged by the use of various modifiers other than PVM. Having fully described the invention, it is desired that the invention be limited only within the lawful scope of the appended claims.

I claim:
1. A method comprising treating a cellulosic semipermeable osmotic membrane with a modifier selected from the group consisting of polyvinyl methyl ether, guartec gum, activated charcoal and copper ferrocyanide and mixtures thereof, said modifier being provided in an amount effective to improve the salt retention characteristics of the membrane.

2. A method for improving the characteristics of a semi-permeable cellulosic osmotic membrane which comprises soaking the membrane in a solution of polyvinyl methyl ether, said polyvinyl methyl ether being provided in the solution in an amount effective to improve the salt retention characteristics of the membrane.

3. The method of claim 2 in which the solution of polyvinyl methyl ether ranges from an amount effective to improve the salt retention characteristics of the membrane to about 10 percent by weight.

4. The method of claim 2 in which the polyvinyl methyl ether solution ranges from about 1 percent to about 5 percent by weight.

5. The method of claim 4 in which the membrane is soaked in the polyvinyl methyl ether solution for a time ranging from about 30 minutes to about 24 hours.

6. A method for improving the salt permeation characteristics of a semi-permeable cellulosic osmotic membrane which comprises passing a feed solution over the membrane, said feed solution containing a modifier selected from the group consisting of polyvinyl methyl ether, guartec gum, activated charcoal and copper ferrocyanide, and mixtures thereof, said modifier being present in an amount effective to improve the salt retention characteristics of the membrane.

7. A method in accordance with claim 6 wherein the modifier is polyvinyl methyl ether and said polyvinyl methyl ether is present in an amount ranging from about 100 parts per million to 500 parts per million of the feed solution.

References Cited

UNITED STATES PATENTS 2,593,540  9/1945  Cornwell et al. _____ 260—17

WILLIAM H. SHORT, *Primary Examiner.*

J. NORRIS, *Assistant Examiner.*